Figure 1:
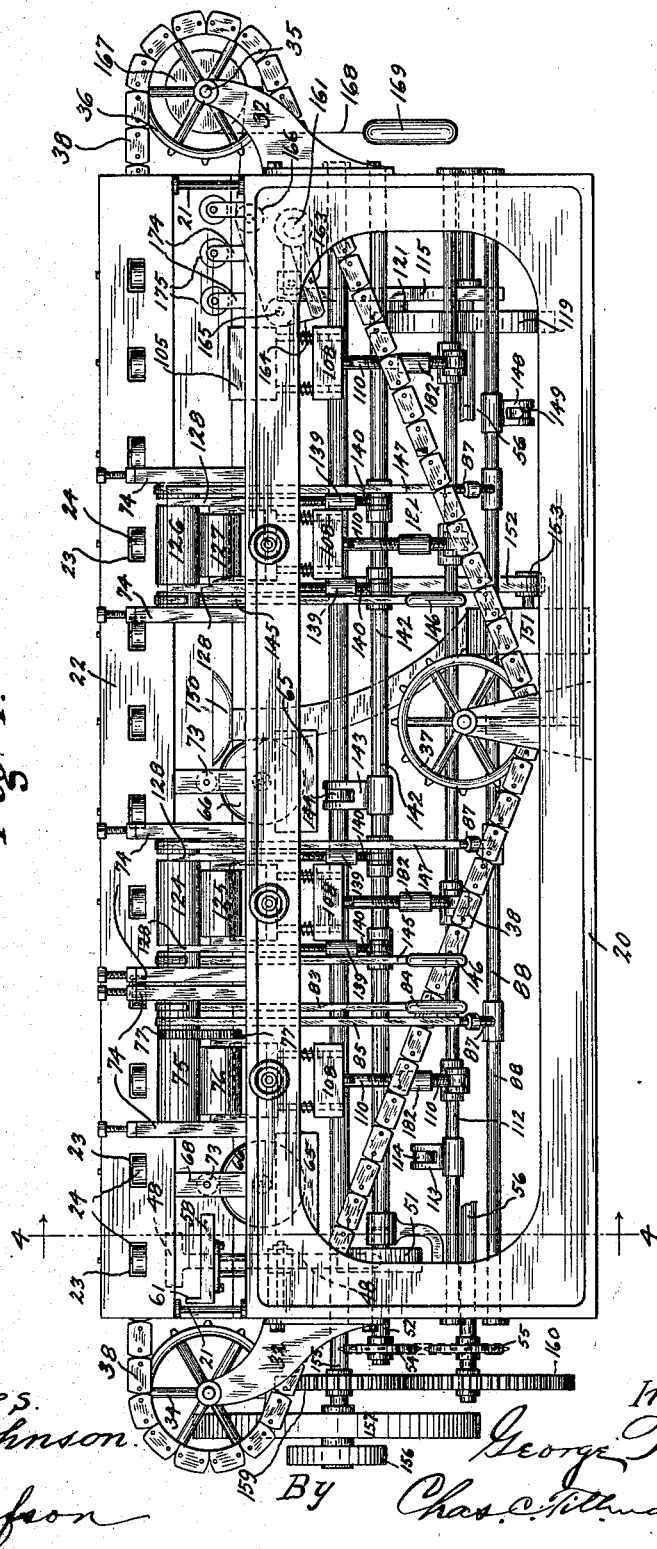

No. 732,910. PATENTED JULY 7, 1903.
G. WALLNER.
BOOKBINDING MACHINE.
APPLICATION FILED MAY 22, 1902.

NO MODEL. 5 SHEETS—SHEET 1.

Witnesses
Otto E. Johnson
A. Gustafson

Inventor
George Wallner
By Chas. C. Tillman
Atty.

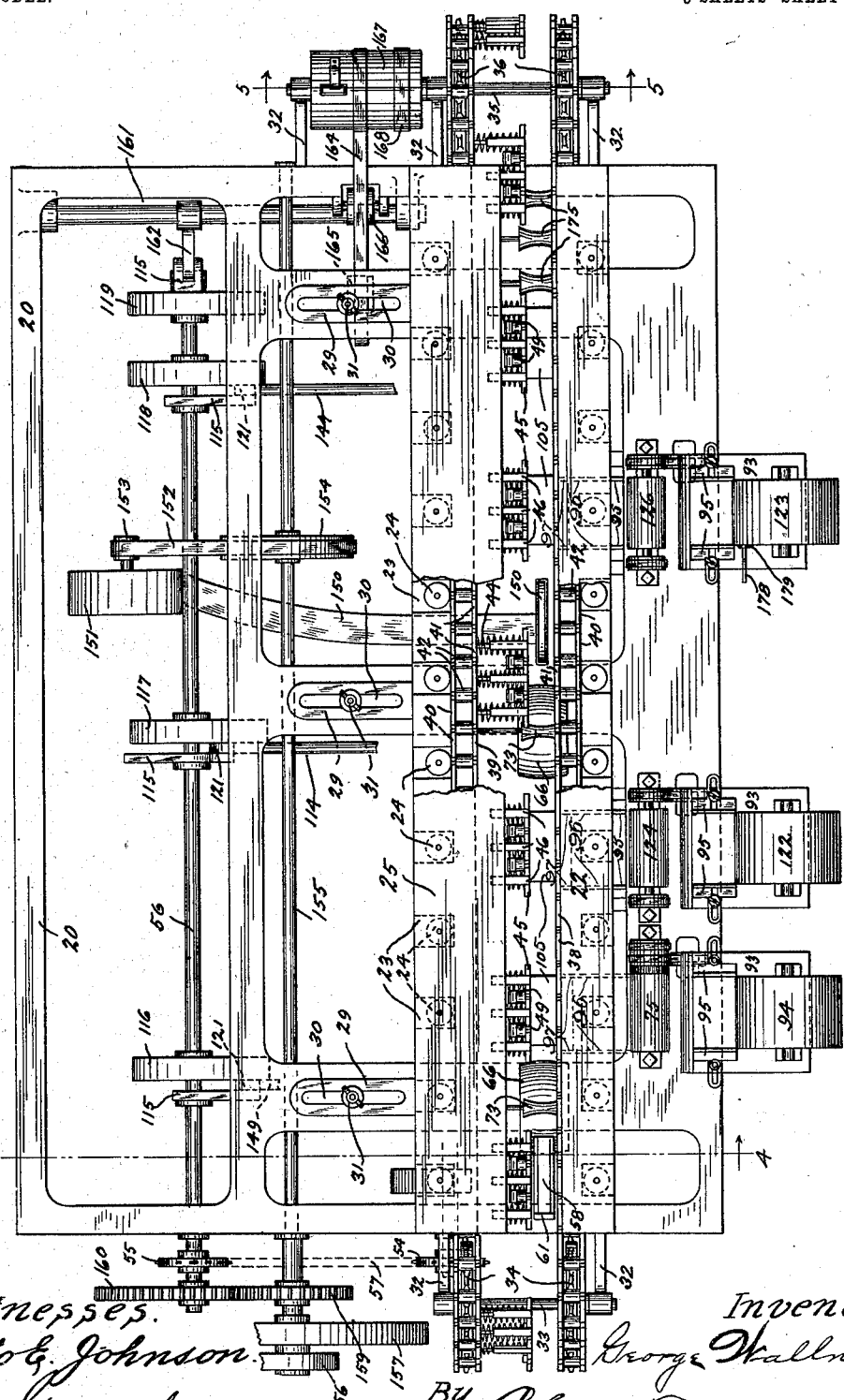

No. 732,910. PATENTED JULY 7, 1903.
G. WALLNER.
BOOKBINDING MACHINE.
APPLICATION FILED MAY 22, 1902.
NO MODEL. 5 SHEETS—SHEET 3.
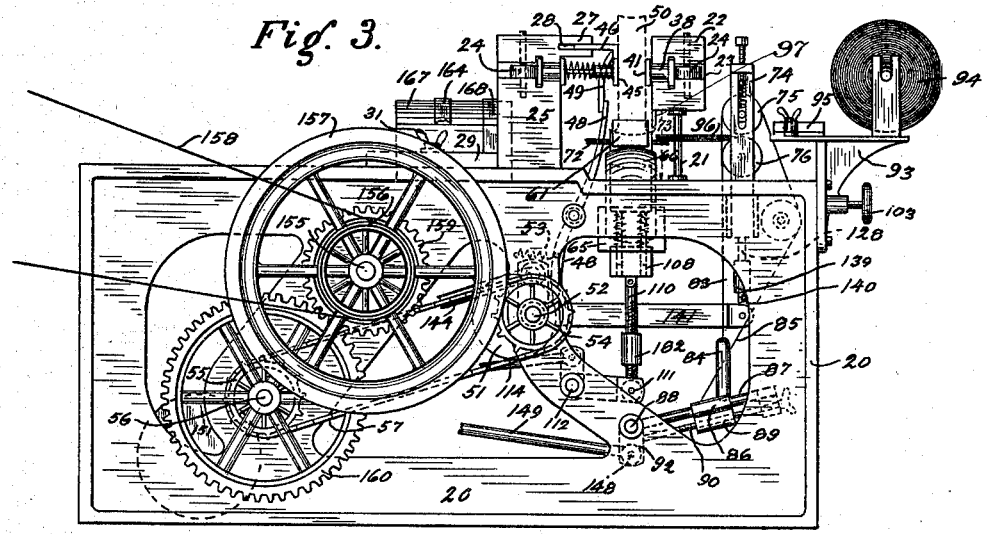
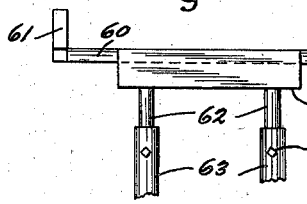
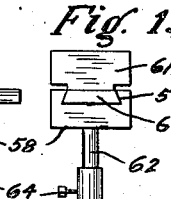
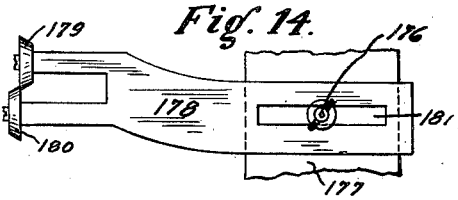
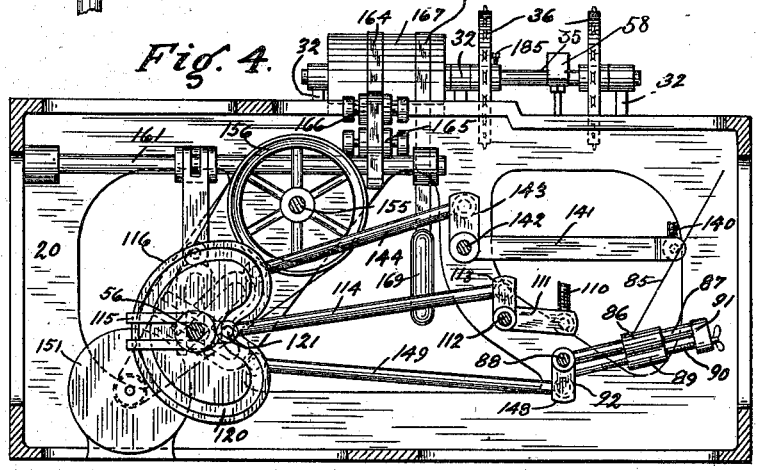
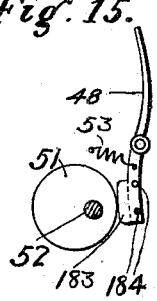
Witnesses.
Otto G. Johnson.
A. Gustafson
Inventor.
George Wallner
By Chas. C. Tillman
Att'y.
THE NORRIS PETERS CO., PHOTO-LITHO., WASHINGTON, D. C.

No. 732,910. PATENTED JULY 7, 1903.
G. WALLNER.
BOOKBINDING MACHINE.
APPLICATION FILED MAY 22, 1902.
NO MODEL. 5 SHEETS—SHEET 4.
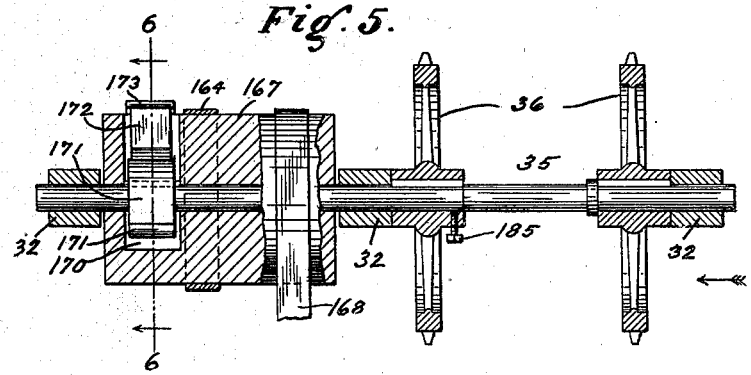
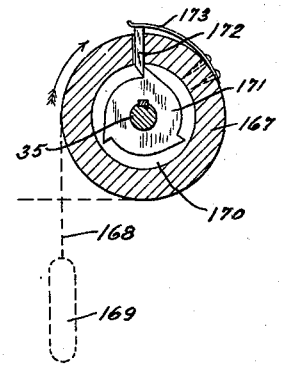
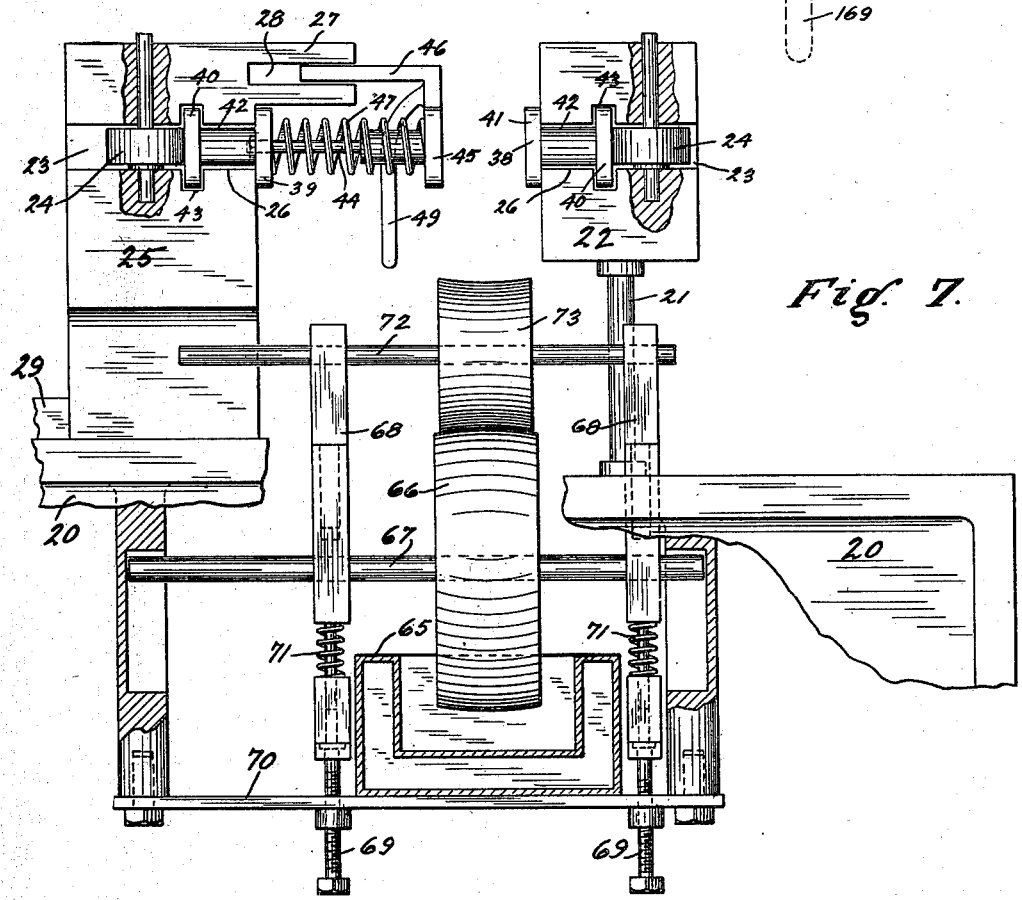
Witnesses.
Otto C. Johnson.
A. Gustafson
Inventor.
George Wallner
By Chas. C. Tillman
Att'y.

No. 732,910. PATENTED JULY 7, 1903.
G. WALLNER.
BOOKBINDING MACHINE.
APPLICATION FILED MAY 22, 1902.
NO MODEL. 5 SHEETS—SHEET 5.
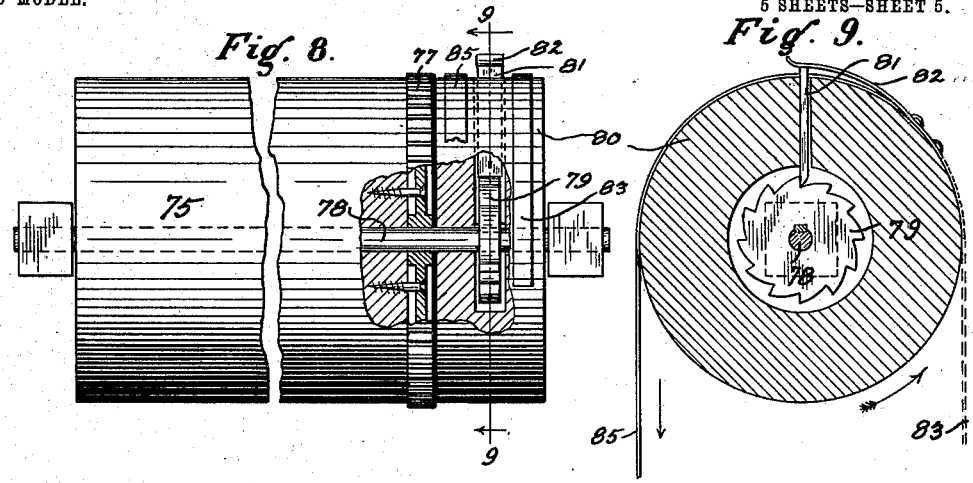
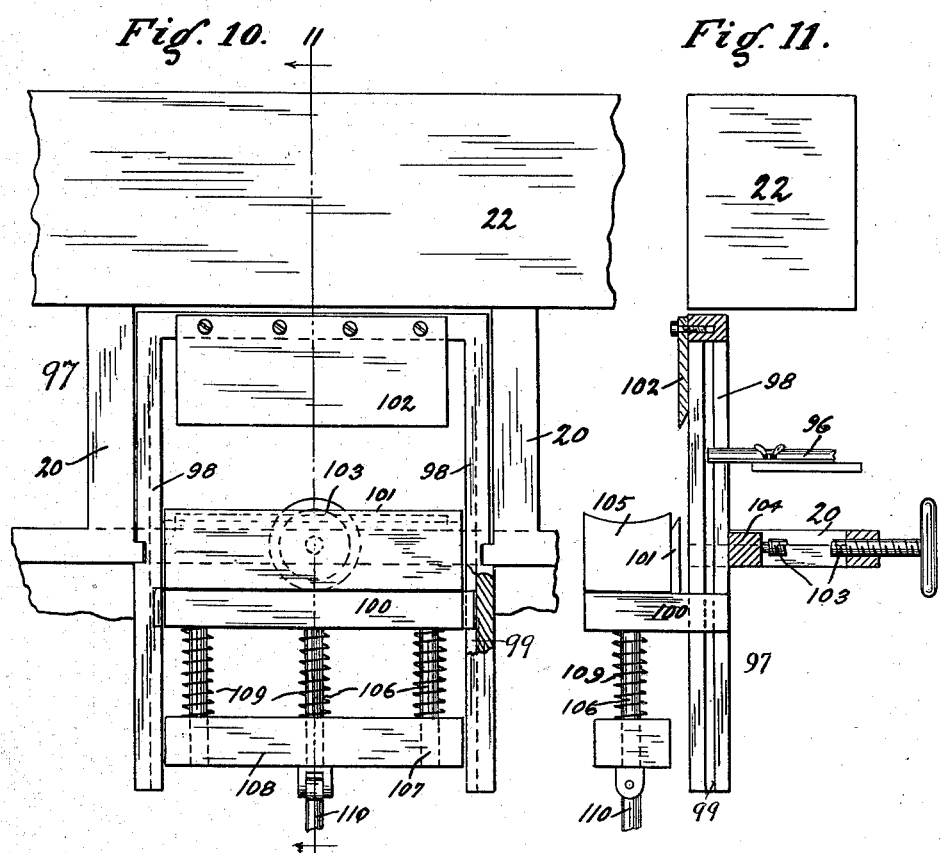

No. 732,910. Patented July 7, 1903.

UNITED STATES PATENT OFFICE.

GEORGE WALLNER, OF CHICAGO, ILLINOIS.

BOOKBINDING-MACHINE.

SPECIFICATION forming part of Letters Patent No. 732,910, dated July 7, 1903.

Application filed May 22, 1902. Serial No. 108,505. (No model.)

*To all whom it may concern:*

Be it known that I, GEORGE WALLNER, a citizen of the United States, residing at Chicago, in the county of Cook and State of Illinois, have invented certain new and useful Improvements in Bookbinding-Machines, of which the following is a specification.

This invention relates to improvements in a machine to be used in the art of bookbinding, and is especially intended and adapted to be employed for doing what is known in said art or to the trade as "head-band and superlining-up work"—that is, for placing and securing on the leaves of books where they are hinged or connected together the necessary coverings of different material therefor; and it consists in certain peculiarities of the construction, novel arrangement, and operation of the various parts thereof, as will be hereinafter more fully set forth and specifically claimed.

The principal object is to provide a machine which shall be simple, automatic, positive, and effective in operation and so constructed that it will securely clamp or hold and carry along the books and apply to the proper portions thereof at the proper times the glue and different materials to be used in the work to be performed.

Another object is to provide means for pressing the material to the edge of the leaves of the books and at about the same time cutting it.

A further object is to furnish means for drying the glue and thereafter giving the final pressure to the completed coverings.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a front view in elevation of a machine embodying my invention. Fig. 2 is a plan view thereof. Fig. 3 is a view in elevation of the feeding or front end of the machine. Fig. 4 is a view, partly in section and partly in elevation, taken on line 4 4 of Figs. 1 and 2 looking in the direction indicated by the arrows, but omitting the primary glue-supplying mechanism and the grooved conveyer-rails for the sake of clearness. Fig. 5 is a sectional view, partly in elevation, taken on line 5 5 of Fig. 2 looking in the direction indicated by the arrows. Fig. 6 is a cross-sectional view taken on line 6 6 of Fig. 5. Fig. 7 is an enlarged view, partly in section and partly in elevation, taken on lines 4 4 of Figs. 1 and 2, showing a part of the main frame, one of the glue-pots, and a pair of rollers for supplying glue to the book and its covering. Fig. 8 is a shortened view of one of the rollers employed for feeding the head-band material, showing a portion thereof broken away to illustrate its operating mechanism. Fig. 9 is a cross-sectional view taken on line 9 9 of Fig. 8 looking in the direction indicated by the arrows. Fig. 10 is an enlarged face view of a portion of the main frame, showing one of the knife-carrying frames and presser-heads. Fig. 11 is a sectional view thereof, taken on line 11 11 of Fig. 10, looking in the direction indicated by the arrows. Fig. 12 is a view in side elevation of the adjustable book-support. Fig. 13 is an end view thereof. Fig. 14 is a detail view in elevation of an adjustable knife-carrier for trimming or cutting the paper; and Fig. 15 is a similar view of the tripping-lever for the clamping-jaws, showing a detachable plate secured thereto.

Corresponding numerals of reference refer to like parts throughout the different views of the drawings.

The numeral 20 represents the main frame of the machine and may be made of any suitable size, form, and material, but preferably rectangular, as shown. Mounted on suitable supports 21 on the upper surface of the frame 20 and extending longitudially thereon is a rail 22, which is provided with a series of recesses 23, in each of which is journaled an antifriction-roller 24 for the purpose presently to be explained.

Mounted on the main frame in parallelism with the rail 22 and at a slight distance therefrom is another rail 25, which is also provided with recesses 23 and antifriction-rollers 24, journaled therein. The rails 22 and 25 are each provided with a longitudinal groove 26, which opens on the adjacent surfaces of said rails, and which grooves also communicate with the recesses 23 in the rails. The rail 25 is provided on its upper portion with an inward extension 27, having a slot 28, as is clearly shown in Figs. 3 and 7 of the drawings. The rail 25 has on its lower portion outwardly-extending arms 29, each of which is provided with a slot 30 for the reception and operation of set-screws 31, secured in the upper surface of the main frame for the purpose of adjusting the rail 25 laterally with respect to the rail 22, which is usually rigidly supported. Journaled on suitable brackets 32, secured to the feed end of the main frame, is a shaft 33, on which are mounted two sprockets 34, which are located opposite the ends of the grooves 26 in the conveyer-rails 22 and 25. (See Fig. 2 of the drawings.) At the delivery end of the main frame and mounted on brackets 32, secured thereto, is a shaft 35, on which is mounted two sprocket-wheels 36, which are also located opposite the ends of the grooves in the conveyer-rails. Journaled on the lower portion of the main frame and at about its middle are two sprocket-wheels or idlers 37, which are placed in alinement with the sprocket-wheels at the ends of the main frame and are used to keep the sprocket-chains 38 and 39 about taut. Each of these chains is made on the well-known principle of the bicycle sprocket-chain—that is to say, each is composed of a series of flat plate-like links 40 and 41, which are pivotally connected by means of links 42, located therebetween. When in position on the sprocket-wheels 34, 36, and 37, they will travel through the grooves 26 of the conveyer-rails 22 and 25 and will be prevented from accidental dislocation by reason of the enlargements 43 in said grooves, in which enlargements the plates or links 40 will travel, while the links 41 will lie close against the inner surfaces of said rails.

At suitable places the chain 39, which is located in the groove of the rail 25, has its plates or links 41 provided with openings, in which are located rods 44, usually three in number, which are united together at their ends adjacent to the rail 22 by means of a bar 45, which has at its upper portion a series of arms 46 extending at right angles therefrom and into the slot 28 of the extension 27 of the rail 25. Surrounding each of the rods 44 and resting at one of its ends against the bar 45 and at its other end against the plates 41 of the chain 39 is a spring 47, which springs tend to press the bar 45 toward the plates 41 of the chain 38, so as to clamp the books 50 therebetween. The bar 45 is provided on its inner surface with one or more downwardly-extending arms 49, with which the upper end of a tripping-lever 48 impinges. This lever is fulcrumed on the front portion of the main frame, so as to contact with the arms 49 at the proper time to retract the bars or jaws 45, so that the books may be inserted between said bars and the plates or links 41 of the chain 38, which comprise the book holders or clamps. The lower portion of the lever 48 extends downwardly, so as to impinge an eccentric 51, mounted on a shaft 52, journaled in the front end of the main frame. The lever 48 is retracted by means of a spring 53, secured at one of its ends to the lower portion thereof and at its other end to a suitable support. Mounted on the outer portion of the shaft 52 is a sprocket-wheel 54, which is geared to a similar wheel 55, mounted on the counter-shaft 56, by means of a sprocket-chain 57.

Mounted on the upper portion of the main frame, near the front or feeding end thereof and between the sprocket-chains of the conveyer, is the book-support, which comprises a block 58, having in its upper surface a dovetailed groove 59, in which is movably located a correspondingly-shaped piece 60, having at one of its ends an upturned portion 61 to form a gage for books of different sizes. The block 58 is provided on its lower portion with downward projections or rods 62, which fit in sockets 63 on the upper portion of the main frame, and which sockets are provided with set-screws 64, used for fixing the rods 62 at the proper positions in their sockets when it is desired to move the support up or down.

Located near the inner end of the book-support or block 58 and below the same is a glue-pot 65, of the ordinary or any preferred construction, in which dips a roller 66, which is mounted on a shaft 67, journaled in uprights 68, which are adjustably supported by means of screws 69 passing through the support 70 for the glue-pot. The uprights or standards 68 are also yieldingly supported by means of springs 71, as is clearly shown in Fig. 7 of the drawings. Mounted on a shaft 72, journaled in the upper portion of the uprights 68, is a concaved roller 73, to which glue is supplied by the roller 66 and which in its turn supplies the glue to the leaves of the book as it passes from the block 58 or book-support. By reference to Fig. 1 of the drawings it will be seen that the upper surface of the roller 73 is in about the same plane with the upper surface of said support.

Journaled one above the other in suitable brackets 74, extending upwardly from the main frame, near the side rail 22 and a little in advance of the glue-rollers 66 and 73, are the head-band feed-rollers 75 and 76, which are preferably made of rubber and contact one with the other. Each of these rollers is preferably provided on its shafts with a cogged gear 77, which mesh one with the other and are used to make their action more positive or perfect. Fixed on the shaft 78 of the roller 75 is a ratchet-wheel 79, which is surrounded by a driving-roller 80, loosely mounted on the shaft 78, and which roller carries a pawl 81 to engage the ratchet-wheel, which pawl is pressed by a spring 82, secured to the outer surface of the last-named roller. Secured at one of its ends to the periphery of the driving-roller 80 is a band or belt 83, which has at its lower end a weight 84. Secured at one of its ends to the periphery of said roller, but extending in the opposite direction from the band or belt 83, is another band or belt 85, which is connected at its other end to a sliding collar 86 on an arm 87, fixed on a rock shaft 88, journaled longitudinally in the main frame. The collar 86 has a screw-threaded extension 89, through which passes a screw-threaded rod 90, which also passes through an arm 91 on the end of the arm 87 and engages at its other end with an arm 92, fixed on the rock-shaft 88. By turning the rod 90 in the proper direction the collar 86 will be advanced or retracted, thereby regulating the action of the belt or strap 85 on the driving-roller 80, as is apparent. The roller 75 and ratchet-wheel 79 being keyed to the shaft 78 and the driving-roller 80 being loosely mounted thereon, it is apparent that as the rock-shaft causes the arm 87 to be lowered the driving-roller 80 will be turned in the direction indicated by the arrows in Fig. 9 of the drawings, in which operation the pawl 81 will engage the ratchet-wheel 79, and thereby cause the shaft 78 and roller 75 to rotate in the same direction. As soon as the arm 87 is raised by the rock-shaft 88 the weighted band 83 will cause the driving-roller 80 to turn in the opposite direction, so that the pawl will take a new hold on the ratchet-wheel, thus being in position to further rotate the roller 75, and by reason of its frictional contact therewith and the gears 77 the roller 76.

Mounted on a bracketed platform 93, secured to the main frame near the rollers 75 and 76, is a roller 94, which carries the headband, which material may pass from said roller between guides 95, adjustably secured on said platform, to and between the rollers 75 and 76, from which it will pass through another guide 96, located near said rollers, and between the same and the knife-carrying frame 97, which is located on the upper portion of the main frame at about the inner portion of the rail 22. The side pieces 98 of the the knife-carrying frame have on their adjacent surfaces grooves 99 for the reception and guidance of projections on the ends of the block 100, to the upper inner end of which is secured a knife 101, which coöperates with a knife 102 to cut the head-bands. Extending through a portion of the main frame 20 is a hand-screw 103, which engages at its inner end a cross-piece 104 on the frame 97 and is used to adjust the position of the knives 101 and 102, so as to regulate the length of the head-bands which they cut.

Secured to the surface of the block 100, alongside of the knife 101, is a presser-head 105, which is shown as being slightly concaved on its upper surface, but which may be flat when used for working on flat-backed books. This presser-head is provided on its lower surface with a number of rods 106, which extend into openings 107 in a cross-bar 108, which is located between the standards 98 of the knife-carrying frame. The rods 106 are each surrounded by a spring 109, which afford a yielding pressure to the presser-head. Pivotally secured to the lower portion of the cross-bar 108 is a rod 110, which is pivotally connected at its other end to an arm 111, fixed on a rock-shaft 112, journaled longitudinally on the main frame. This rock-shaft is also provided with a fixed arm 113, to which is pivotally secured one end of a rod 114, which is pivotally connected at its other end to a forked member 115, which strides the counter-shaft 56, which carries a number of cams 116, 117, 118, and 119, each of which is provided on one of its faces with a cam-groove 120, substantially heart-shaped. The forked member 115 is provided near the juncture of its prongs with a roller 121, which operates in said groove.

Located on brackets 93 on the upper portion of the side of the main frame are rollers 122 and 123, the former being near the headband roller 94 and the latter at some distance from the delivery end of the main frame. The roller 122 is used for carrying the "super" or crash, which is placed on the back of the book after the head-bands have been placed thereon, and the roller 123 is for the paper, which is placed over the super or crash. Each of the brackets on which the rollers 122 and 123 are mounted is provided with guides 95, similar to those used on the bracket of the roller 94 and above mentioned. Between the roller 122 and the conveyer-rail 22 are adjustably journaled one above the other in contact rollers 124 and 125, and between the roller 123 and the rail 22 are similarly journaled rollers 126 and 127. Each of the rollers 124 and 126 has its bearing in bars 128, the lower ends of which are screw-threaded and are connected by means of turnbuckles 139 to screw-threaded rods 140, pivotally connected to bars 141, which are fixed on the rock-shaft 142, which is provided with a fixed arm 143, to which is pivotally connected at one of its ends a rod 144, which is similarly connected at its other end to one of the forked members 115, which strides the counter-shaft 56 and engages one of the cams thereon. On one end of each of the rollers 124 and 126 is secured a belt or strap 145, which has at its other end a weight 146, and on the other end of each of said rollers is secured and extends in the opposite direction a band or strap 147, which is secured at its other end to an arm 87 on the rock-shaft 88, which shaft is provided with a fixed arm 148, to which is pivotally connected at one of its ends a rod 149, which is pivotally connected at its other end to one of the forked members 115, which strides the counter-shaft 56 and engages one of the cams on said shaft. When the shaft 88 is rocked, the arms 87 and bars 141 will be raised and lowered through their connections with the cams, in which operation the bars 128 will be raised and lowered, and the bands 147 will cause the rollers 124 and 126 to rotate in one direction, and the bands 145, by reason of their weights 146, will cause them to be rotated in the other direction, thus feeding the super or crash and the paper which passes from the rolls 122 and 123 between their respective feeding-rollers to the knife-frames and the presser-heads, which are located near each of the said pairs of feed-rollers at the inner surface of the rail 22, and which knife-frames are of similar construction to that shown in Figs. 10 and 11 of the drawings and above described.

Located below and between the rails 22 and 25, somewhat in advance of the feed-rollers 124 and 125, is another glue-pot 65, which is provided with rollers 66 and 73 of a similar construction as those shown in Fig. 7 of the drawings and which rollers are employed to place glue on the super or crash. Located slightly in advance of the last-named glue-rollers is the flaring air-pipe 150, which communicates with a blower or fan 151, located on the lower portion of the main frame, and which may be driven by means of a belt 152 on its shaft 153, which belt passes over a pulley 154, mounted on the main or driving shaft 155, which is journaled longitudinally in the main frame and has on its front end a pulley 156 and a fly-wheel 157, to the former of which a belt 158 may be applied for transmitting power thereto.

Mounted on the driving-shaft near the fly-wheel 157 is a cogged gear 159, which meshes with a gear 160 on the front end of the counter-shaft 56, which carries the cams. Transversely journaled on the main frame at its delivery end is a rock-shaft 161, to which is fixed an arm 162, which is pivotally connected to one of the forked members 115, which strides the shaft 56 and engages the cam 119 thereon. Fixed on the shaft 161 is another arm 163, to which is connected one end of a belt or band 164, which passes over rollers 165 and 166, journaled on the main frame near its delivery end. The other end of this belt is attached to a roller 167, loosely mounted on the shaft 35, which carries the sprocket-wheels 36, at the delivery end of the main frame. Secured at one of its ends to the roller 167 and extending in an opposite direction from the band or belt 164 is another band or belt 168, which has at its lower end a weight 169, used for retracting the roller 167 after it has been rotated through its connection with the rock-shaft 161. The roller 167 is provided with a cavity 170, within which is located a ratchet-wheel 171, which is keyed to the shaft 35 and turns therewith, as will be readily understood by reference to Fig. 6 of the drawings. The roller 167 carries a pawl 172, which is pressed inwardly, so as to engage the ratchet-wheel 171, by means of a spring 173, secured to its outer surface, thus causing the shaft 35 to intermittently rotate on the downward stroke of the arm 163 on the shaft 161, which, as before stated, is rocked by means of its connection with the cam 119 on the counter-shaft.

Journaled on suitable brackets 174 on the upper surface of the main frame near its delivery end and below and between the conveyer-rails 22 and 25 are a number of rollers 175, which are preferably concaved, but may be cylindrical when used for flat-backed books. Near and between the inner one of these rollers and the knife-frame 97, opposite the rollers 126 and 127, is a presser-head 105 of the same construction as that shown in Fig. 11 of the drawings, except that the blades or knives 101 and 102 are omitted, and said presser-head is operated in a similar manner as those used opposite each of the pairs of feeding-rollers. This last-named presser-head is employed to give the final pressure to the covering on the books. On the bracketed platform 93, on which the paper-carrying roller 123 is mounted, is adjustably secured, by means of a set-screw 176 on a standard 177, fixed to the platform 93, a bar 178, which has journaled on its forked end two rotary knives 179 and 180, which are used to cut the paper when desired as it is unwound from the roller 123. The bar 178, carrying the rotary knives, may be adjusted with respect to the roll of paper by moving it in the proper direction on the standard 177, which can be done by loosening the set-screw which passes through the slot 181 in said bar, as is evident.

The rods 110, supporting the cross-bars 108 of the presser-heads, are preferably made in two pieces and are connected together by means of turnbuckles 182, so as to regulate the movement of the presser-head and the movable knife. The bands or belts for operating the feed-rollers for the different material and for the roller on the shaft 35 may be made of any suitable material of sufficient strength and durability.

From the foregoing and by reference to the drawings it will be seen and clearly understood that by applying power to the main or driving shaft, and thereby rotating the same, power will be transmitted therefrom to the counter-shaft 56 through the cogged gears 159 and 160 and from said counter-shaft to the shaft 52, on which the eccentric 51 is mounted. In the rotation of the counter-shaft 56 it is apparent that by reason of their connections with the cams on the counter-shaft the shafts 88, 112, 142, and 161 will be rocked, thus imparting the necessary motion to their respective parts. As before explained, when the shaft 161 is rocked, so as to depress the arm 163 thereon, the shaft 35 will be intermittently rotated, thus causing the conveyer comprising the chains 38 and 39 to travel intermittently through the grooves of the conveyer-rails 22 and 25, in which operation the lever 48 will be acted on by the eccentric 51, so as to press the bars or jaws 45 toward the chain 39, which carries the same, thus allowing the books to be placed between said jaws or clamps and the plates 41 of the chain 38 of the conveyer, so as to rest on the support or block 58, which is located slightly below and between the chains comprising the conveyer. As soon as the lever 48 is released from the eccentric the springs 47 will press the jaws or clamps 45 toward the chain 38, thus firmly clamping the book 50, so that it will be carried along by the conveyer, in which operation its back or that portion on which the material is to be secured will come in contact with the roller 73 and be supplied with glue or paste thereby. As it passes the head-band feed-rollers 75 and 76 the head-bands will be fed thereto through the guides 96 and interposed between the book and the presser-head 105, when the same will be raised, thus pressing the head-bands to the book and at the same time cutting them off. After this operation has been performed the book will pass the super or crash feed rollers 124 and 125, when the same operation of feeding the material thereto will take place, and the presser-head and knives opposite the last-named feed-rolls will perform their functions of pressing and cutting the crash or super, after which the book will pass over and in contact with the second roller 73 and receive a further supply of glue therefrom, after which it will be exposed to a draft of air when necessary through the air-pipe 150. As it passes along and when it reaches a point opposite the paper-feed rollers 126 and 127 said rollers will supply paper thereto, which will be pressed and cut by the knives and presser-head located near the same. As the book is conveyed farther the presser-head located near the rollers 175 will afford the final pressure thereto, after which the book will pass over the rollers 175 and out at the delivery end of the main frame. It is apparent that the cams on the counter-shaft 56 will be so adjusted as to operate their respective parts at the proper times and that the rollers 124 and 126 will be raised on their supporting-bars 128 at the time they are backwardly rotating by means of the weighted belts 145, thus preventing them acting on the crash or paper in said movement and besides allowing the paper to be presented to the book in the proper manner or without any deviation from a right angle thereto, as might occur if the rollers were continually in contact. In order that the lever 48 shall properly coöperate with the arms 49 on the clamping-jaws 45 and the eccentric 51 when books of different thicknesses are being treated, I may provide the lower portion of the lever with a detachable plate 183, which is secured on the surface of the lever adjacent to the cam 51 by means of set-screws 184 or otherwise. One of the sprocket-wheels 36 on the shaft 35 and one of the sprocket-wheels 34 on the shaft 33 may be suitably mounted on said shafts so as to adjust the chain 39, which they carry, with respect to the chain 38 of the conveyer, and said sprocket-wheels may be secured to their shafts by means of set-screws 185 passing through their hubs.

Having thus fully described my invention, what I claim as new, and desire to secure by Letters Patent, is—

1. The combination with the main frame, of a main driving-shaft journaled longitudinally thereon, the conveyer-rails mounted longitudinally and in parallelism on the main frame, antifriction-rollers journaled on each of the said rails, a conveyer comprising two endless chains located on the said rails in contact with the antifriction-rollers, spring-actuated jaws or bars for the books on one of said chains, and means connecting the driving-shaft and conveyer to intermittently move the latter along, substantially as described.

2. The combination with the main frame, of the conveyer-rails mounted thereon in parallelism and having in their adjacent portions longitudinal grooves and in their outer portions recesses communicating with said grooves, rollers journaled in said recesses, a conveyer comprising two endless chains located in said grooves and in contact with the rollers, spring-actuated jaws or bars for the books on one of said chains, and means to cause the conveyer to travel intermittently along the rails, substantially as described.

3. The combination with the main frame, of the conveyer-rails mounted thereon and having in their adjacent portions longitudinal grooves, a series of antifriction-rollers journaled on each of the rails and extending into the grooves thereof, a conveyer comprising two endless chains located in said grooves in contact with the rollers, spring-actuated jaws or bars on one of said chains, and means to cause the conveyer to travel intermittently along the rails, substantially as described.

4. The combination with the main frame, of the conveyer-rails mounted thereon in parallelism, each of said rails having on its inner portion a groove provided with an enlargement, a conveyer comprising two endless chains each made of a series of flat plates or links connected together by links therebetween and located in said grooves so that one row of the links will lie in the enlargement of the groove of each rail, spring-actuated jaws or bars for clamping the books on one of said chains, and means to cause the conveyer to travel intermittently along the rails, substantially as described.

5. The combination with the main frame, of the grooved conveyer-rails mounted thereon in parallelism, a conveyer comprising two endless chains located in the grooves of said rails, spring-actuated jaws or bars on one of said chains for clamping the books, a tripping-lever fulcrumed on the main frame and adapted to engage the jaws, an eccentric journaled near the lower portion of said lever so as to act on the same, and means to rotate the eccentric and to cause the conveyer to travel intermittently along the rails, substantially as described.

6. The combination with the main frame, of the grooved conveyer-rails mounted thereon in parallelism, one of said rails having a slotted lateral extension projecting toward the other rail, a conveyer comprising two endless chains located in the grooves of the rails, spring-actuated jaws or bars on one of said chains and having arms extending into the slot of the said extension and provided with downturned arms, a tripping-lever fulcrumed on the main frame and adapted to engage said downturned arms, an eccentric journaled near the lower portion of said lever so as to coact therewith, and means to rotate the eccentric and to cause the conveyer to travel intermittently along the rails, substantially as described.

7. The combination with the main frame, of the grooved conveyer-rails mounted thereon in parallelism, a pair of sprocket-wheels journaled at each end of the main frame near the ends of said rails, a conveyer comprising two endless sprocket-chains located in the grooves of the said rails and passing over said sprocket-wheels, a roller loosely mounted on the shaft of one of the pairs of sprocket-wheels and carrying a spring-actuated pawl, a ratchet-wheel fixed on said shaft in engagement with the pawl, a rock-shaft journaled transversely on the main frame and parallel with the shaft of said roller, an arm fixed on the rock-shaft, a belt or band secured at one of its ends to the roller and at its other end to the arm of the rock-shaft, another belt secured at one of its ends to the roller and extending in the opposite direction from the first-named belt and having on its lower end a weight, and means to operate the said rock-shaft whereby the conveyer will be caused to travel intermittently along the rails, substantially as described.

8. The combination with the main frame, of a driving-shaft journaled longitudinally thereon, a counter-shaft journaled longitudinally on the main frame and geared to the driving-shaft, the grooved conveyer-rails mounted on the main frame, a pair of sprocket-wheels journaled at each end of the main frame opposite the ends of the conveyer-rails, a conveyer comprising two sprocket-chains located in the grooves of the rails and passing over said sprocket-wheels, a roller loosely mounted on the shaft of one pair of said sprocket-wheels and carrying a spring-actuated pawl, a ratchet-wheel fixed on said shaft and in engagement with said pawl, a rock-shaft transversely journaled on the main frame parallel with the shaft of said roller, an arm fixed on said rock-shaft, a cam on the counter-shaft, a forked member striding the counter-shaft and engaging said cam and pivotally secured to the arm on the rock-shaft, another arm fixed on the rock-shaft, a belt secured at one of its ends to the said roller and at its other end to the last-named arm, and another belt secured at one of its ends to the roller and extending in the opposite direction from the first-named belt and provided at its other end with a weight, substantially as described.

9. In a bookbinding-machine, the combination with the main frame, of a rock-shaft journaled thereon, an arm fixed on said shaft, a roller mounted on a shaft journaled near the rock-shaft and carrying a spring-pressed pawl, a ratchet-wheel fixed on the shaft of the roller, a belt secured at one of its ends to the roller and at its other end to the said arm, another belt secured at one of its ends to the roller and extending in the opposite direction from the first-named belt and having at its other end a weight, and means to operate the rock-shaft, substantially as described.

In witness whereof I hereunto sign my name in the presence of two witnesses.

GEORGE WALLNER.

Witnesses:
CHAS. C. TILLMAN,
A. GUSTAFSON.